United States Patent [19]
Moore

[11] 3,982,362
[45] Sept. 28, 1976

[54] INSULATED STRUCTURE OF END-JOINED CANS AND STUCCOED MESH

[76] Inventor: Alvin Edward Moore, Manini Way, Diamondhead, Rte. 1, Bay St. Louis, Miss. 39520

[22] Filed: Feb. 24, 1975

[21] Appl. No.: 552,622

[52] U.S. Cl. .................................. 52/91; 52/404; 52/DIG. 9
[51] Int. Cl.² .......................................... E04C 1/06
[58] Field of Search .......... 52/91, 404, 406, DIG. 9, 52/127; 109/1 S

[56] References Cited
UNITED STATES PATENTS

| | | | |
|---|---|---|---|
| 1,671,462 | 5/1928 | Bemis | 52/91 |
| 2,344,749 | 3/1944 | Stevens | 52/91 X |
| 3,857,215 | 12/1974 | Moore | 52/204 X |

*Primary Examiner*—J. Karl Bell
*Attorney, Agent, or Firm*—Alvin Edward Moore; Harry E. Thomason

[57] ABSTRACT

A low-cost building, building section or wall, usable as a house, mobile home, vehicle, or part of these or other structures, having numerous parallel rows of end-joined used or new cans, each can preferably consisting of a tube and can-cover elements at ends of the tube and containing thermal insulation, which may be only dead air in the relatively small hollow can space but preferably includes loose small portions of low-cost insulating material, such as sawdust, vermiculite, cotton linters, dry sand or dust, ashes, cinders, ground bark, rice or other seed hulls. Abutting pairs of can cover elements are tightly held together by connecting means which may be bonding material (epoxy putty, solder or the like) or bands of slightly stretchable adhesive tape which encompass and adhere to portions of juxtaposed pairs of the end-joined cans. A layer of mesh sheathes one side of each group of the can rows, and the other side is sheathed with wall material which may be mesh or insulating solid panels. Rod-like elements (bolts, rivets, pieces of wire or the like) go thru a layer of mesh, between adjacent can rows and thru the other layer of wall material, clamping them in assembled relation; and stucco impregnates and coats the mesh. FIGS. 2 to 5 show corners of the walls or roof-and-ceiling structure, including strips that are screwed to can material. The cans may be of the type that contain liquid drink, paint, or coffee, or may be glass jars. Optionally, used cans, each of which has only one end cover and its other end open, may be utilized.

15 Claims, 12 Drawing Figures

U.S. Patent   Sept. 28, 1976   3,982,362
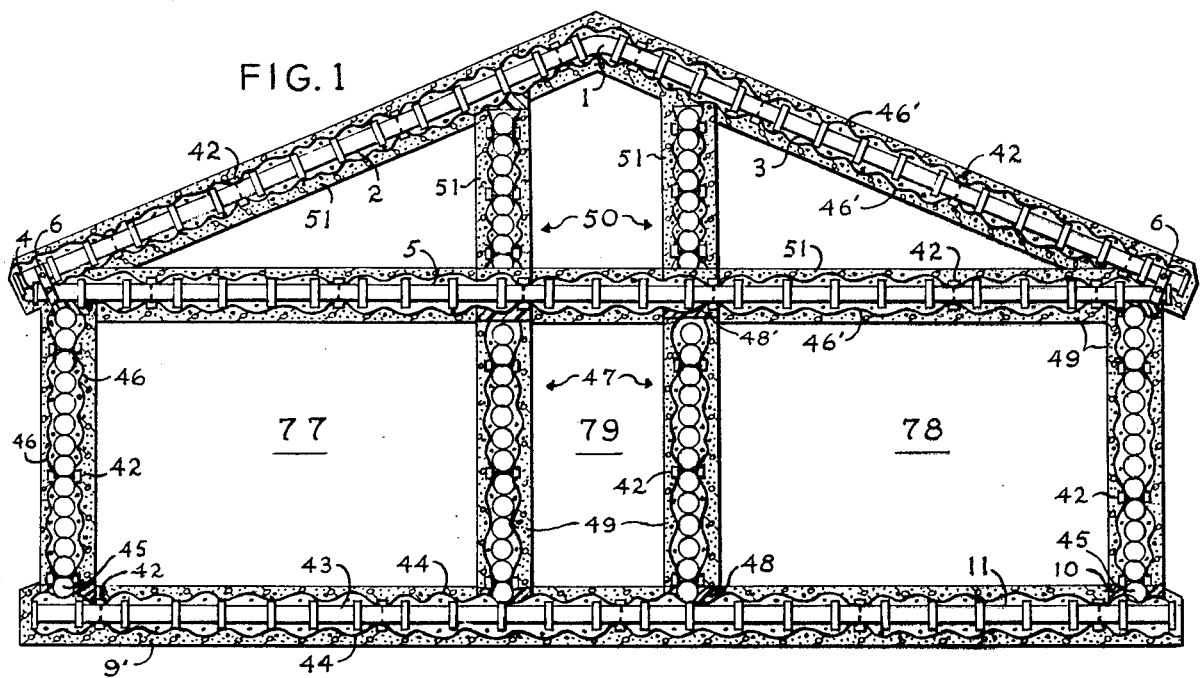

INSULATED STRUCTURE OF END-JOINED CANS AND STUCCOED MESH

This invention pertains to a building, wall, floor or roof, and is usable in the manufacture of low-cost housing, house sections, mobile homes, or, in some of its variations, of vehicles or other movable structures, as well as to a method of making such structures.

Hundreds of millions of human individuals and families do not have the large amounts of money necessary to buy and pay taxes on homes built by the expensive conventional methods of construction in the industrialized countries. Because the insulation that is commonly used and the complex wall construction that goes with it are very costly, these people frequently endure great extremes of heat and cold in poorly insulated houses or shacks.

In view of these facts, some objects of this invention are to provide: (1) a simply and economically constructed but strong building, wall, or the like, which comprises low-cost insulation in sealed end-to-end-joined cans or containers; (2) such a structure having a plurality of sets of parallel pairs of adjacent rows of end-joined containers, each row in each of the sets being joined at an angle to a similar row of containers of another set; (3) structure as in (2) above in which the adjacent ends of angularly-joined rows are connected by a metallic strip or bar (which may be of pipe strap) and/or solder, epoxy putty or other bonding material; (4) tubular frames of upright walls or a roof, each having angularly-joined groups of rows of coaxial cans, each adjacent pair of these groups at a corner having their can-row axes intersecting at an angle; (5) structure as in (4) above which includes a layer of mesh on each side of each tubular-wall frame of the walls, roof and ceiling of a building and a coat of stucco or the like on each of the mesh layers; (6) upright tubular-wall frames defining an inclosure, including horizontally-stacked, plural row members, each of said members having a plurality of angularly-joined pairs of rows of cans that are joined at wall corners of adjacent row-end cans, each of the adjacent upper and lower pairs of the wall corners including a lower row-end can-cover facing in one direction and an upper row-end can-cover facing in an opposite direction. These and other objects of the invention are indicated in the following specification and the attached drawings.

In these drawings: FIG. 1 is a view from a vertical, sectional plane thru a middle part of a house or other inclosure; FIG. 2 is a fragmentary view from a vertical plane that intersects a foundation and mortar layer, showing in elevation part of a corner of an upright tubular-wall frame (before application of layers of mesh and stucco); FIG. 3 is a fragmentary view from a plane slanted to the vertical of one side of the peak portion of a tubular-roof frame; FIG. 4 is a fragmentary sectional view, which may be considered as from either a vertical or a horizontal sectional plane, illustrating an alternative type of corner between can-row ends of an angled pair of the elongated tubular members; FIG. 5 is a fragmentary sectional view, similar to FIG. 4, illustrating a corner connection between can-row ends that is usable at the peak of a roof but is specifically shown as at a corner of an upright wall; FIG. 6 is a fragmentary sectional view of an elongated can row, usable in the structures of FIGS. 1 to 5 and 6A, in which ends of the cans are held together by adhesive tape; FIG. 6A is a fragmentary, sectional view from a plane across can tubes of parallel rows of cans, and across a portion of the completed structure of an upright or horizontal wall, showing optional alternative structural details; FIG. 7 is a plan view of an optionally used common type of can, containing insulation; FIG. 8 is a fragmentary view of another form of can row usable in the structures of FIGS. 1 to 5 and 6A, showing cans of the common coffee-containing type, held together by stretchable adhesive tape; FIG. 9, similar to FIG. 8, shows an alternative assembly of tape-joined, coffee-containing-type cans; FIG. 10 is a fragmentary sectional view of another form of can row usable in the structures of FIGS. 1 to 5 and 6A, showing end-joined jars or bottles; FIG. 11 is a sectional view, illustrating an optional method of fastening together removable end caps of cans; and FIG. 12 is a fragmentary sectional view of a row of end-joined cans of different diameters, optionally usable in the structures of FIGS. 1 to 5 and 6A.

The structure of FIG. 1 is preferably a dwelling house, mobile home, lawn building, shop, office or the like. The tubular frames of the roof and attic floor of this structure comprise numerous triangular members, juxtaposed to each other, each adjacent pair of these members being fastened together at adjacent points of their can sidewalls by loops of twisted-end wire or of pipe strap and small bolts, and preferably also fastened together by epoxy putty, solder, or other bonding material. Each of these triangular members has three rows of end-joined cans of any of the types shown in FIGS. 6 to 12, triangularly joined at three corners. Each of the roof-peak corners comprises an elbow, 1, of the plastic type commonly used in plumbing as a pipe fitting or, alternatively, of the thin-metal stovepipe-elbow type. The elbow is of a size adapted to fit over can ends - for example, three or four inches in diameter with sufficient clearance for bonding material between the can ends and inside surfaces of the elbow. This bonding material may be epoxy putty, mortar or the like, placed on each upper end cap of the can rows 2 and 3 before it is inserted into the elbow. Each of the lower corners of the triangular member comprises a row-end connection of the type illustrated in FIG. 1 or, alternatively, one of the connections of FIGS. 3 to 5. As illustrated in FIG. 1, a bottom portion of the lower-end can of each slanted row (2 or 3) has a slit cut in it, and into this slit, jamming upward bent portions of the can-sidewalls, the upper part of the rim of the can-end cap 4 is placed and held there by epoxy putty, solder or other bonding material. In addition to this connecting means, preferably a strong loop is tautly placed around the end cans of the horizontal row 5 and the slanted row (2 or 3). This loop may be a band of apertured pipe strap, 6, optionally twisted or bent at an angle on each side of the end can, and tightened about the two ends of the can row by placing a bolt thru opposite apertures of the pipe-strap loop, between the row-end cans. Alternatively, the loop may be a band of wire tightened by plier-twisting together the wire ends. The triangular members are sub-assembled, and then placed and fastened together in side-by-side arrangement.

The tubular frames of the four outer upright walls (only two of which are shown in FIG. 1) may be joined at each of their four corners by the type of connection shown in FIG. 2, FIG. 4, or FIG. 5. In FIG. 2, the lower front can row 7 is exampled as resting on a layer of mortar 8 which is on a concrete slab or other foundation 9; but optionally, as indicated in FIG. 1, this row 7 may be fastened by twisted-wire loops and the epoxy putty 10 to the lower-floor tubular frame 11. The axis of the left-hand row-end can 12 intersects the axis of the left-hand side row and of its end can 13, preferably at a right angle. The two adjacent end cans 12 and 13 may be fastened together by the bent metallic strip 14, which preferably is of apertured pipe strap. This strip 14 is fastened to the tube or sidewall of the can 12 by the two illustrated sheet-metal screws, and to the outer end cap of the can 12 and the sidewall of the can 13 by similar screws. The right-hand end can 15 of the row 7 is located at a point inward of the right corner outline and the stucco that goes on it, and inward of the adjacent end-can 16 of the bottom side can row of the structure. These cans 15 and 16 are fastened together by the screws 17 and 18 which go into the cans after passing thru the bar or piece of pipe strap 19. This metallic strip preferably terminates on the viewer's right inside the periphery of the end cover of 16, as indicated at the right-hand end of the strip 19'. When the can's tubes are of metal or plastic both of the sets of screws 17 and 18 are used, but when the can's sidewalls are of glass jars, the screws 18 penetrate the removable metallic or plastic end caps and instead of the screws 17 epoxy putty penetrates the apertures of the strap and mounds over the strip and to roughened portions of the glass of the type illustrated in FIG. 10.

In the top part of FIG. 2 a variation of the strip 14 is indicated at 19''. This strap or bar is like the element 19 and is fastened by screws that extend thru the strip only into the cover 16' of a row-end can 16 and to the sidewall of the can 13'. Preferably, all the straps that hold adjacent angled can-covers of the angled can rows are of the same type and interchangeable. The type of strap or bar shown at 19 is currently preferred in all the joints between can rows.

After the four rectangularly joined lower can rows 7 are in place a second set or stacked tier of four angled tubular members, 20, is stacked on the rows 7 and preferably fastened to them by lumps of epoxy putty or other pasty glue (and/or twisted-wire loops), at the corners of the structure. Here, instead of the right-hand end-can of the row 20 being terminated inward of the structure's corner outline and the stucco on it (as in the bottom can row 7), it is the left-hand can 21 that thus terminates. The angled tubular members 20 of the second set of can rows are fastened at the corners or joints as are the lower rows 7, but in this second set the front right-angled strap 14 is at the viewer's right.

The third stacked set of can rows is like the set of rows 7, with the front right-angled strap 14 on the viewer's left. Thus the sets are stacked and preferably fastened to lower sets, with alternating positions of the row-end cans, up to the top of the four upright walls. At each corner of the desired structure there is an outwardly located cover of a row-end can which is closely adjacent to the outer outline and stuccoed surface of the structure and is also angularly in contact with an inwardly located cover of an end can of the other row of the tier at this corner, this last-named can-cover being located inward of the outer outlines of the structure. And in every tier above that of the rows 7 both this inwardly located cover and the said outwardly located cover are located above portions of the sidewall tube of a lower-row can.

As illustrated in FIG. 3, a similar arrangement of elongated can rows may be used as a tubular roof frame. FIG. 3 is a fragmentary view of one slanted side of a gabled roof, with the viewer's line of sight being perpendicular to this roof side. The roof-peak angled portion at the top of the structure of this figure, which is similar to one of the four wall corners of FIG. 2, may be referred to as a roof-peak corner; and preferably the angle between the two roof sides at this roof corner is approximately ninety degrees. From the viewer's left: one angled pair of the roof can rows comprises the elongated, rafter-like tubular member 22, of which the upper can-cover of the top row-end can 23 terminates the can row of 22 below the roof ridge, and further comprises a can row on the other side of the roof, of which the upper can cover 24 is shown as approximately at the roof-ridge line; the next pair from the left of the rafter-like tubular members includes the can row 25, of which the upper can 26 has an upper can-cover approximately at the roof ridge, and further includes an opposite rafter-like tubular member on the other side of the roof, of which the upper can-end cover, shown at 27, is below the roof peak a distance approximately equal to the diameter of the can 26 the sidewall of which 27 contacts; and a third pair of the rafter-like can rows, 28, comprises the upper row-end can 29, terminating below the roof peak, and a can row on the opposite side of the roof, of which the upper can-cover, shown at 30, is approximately at the roof ridge and is in contact with the can 29. The connections between the contacting cans of the angled pairs of the roof frame are similar to those of FIG. 2. One of the straps or bars 19' is fastened to the sidewall of the can 23 and the can-cover 24 by four screws and the other is similarly fastened to the sidewall of the can 29 and the can-cover 30. For clarity of illustration of the middle joint shown, an angled strap or angle iron similar to 14 of FIG. 2 is exampled as fastened by screws to the sidewall, to an end cap of the can 26 and to the sidewall of the can which has the cover 27. But preferably this strap is like the element 19' of FIGS. 2 and 3 and the strap 19'' of FIG. 2.

Alternatively, the corner between adjacent can-row ends, of either the roof or the upright wall may be of the type fragmentarily illustrated in FIG. 4 or FIG. 5. In FIG. 4, the cans 22 and 23 at ends of a joined pair of the can rows are fastened to each other by the angle iron or bent piece of pipe strap 34 and screws 35. In FIG. 5, the row-end cans 36 and 37 are connected by the angled strip of mesh 38, the screws which fasten the mesh to can-covers, and the mortar which optionally impregnates and coats the network. This mesh may be either a relatively narrow strip which fastens together only two row-end can-covers or an elongated angled piece — for example, a length of corner bead such as is used in plastering. The space 40 within the ends of the angled element 34 may be filled with insulation (for example, by a bent strip of fiberglass insulation or cinder concrete which optionally may be applied in pasty form or as a preformed concrete unit of desired size). The joint in FIG. 5 is shown as associated with one of a plurality of vertically stacked cinder-concrete blocks (41); and thus this corner is specifically exampled as part of an upright wall.

The structure of FIGS. 1 to 5 is completed by: sheathing both sides of each of the tubular frames with substantially parallel layers of mesh (optionally, metallic hardware cloth, expanded-metal lath, plastic network, or the like); fastening these layers of mesh together and to the can rows by the small-diameter bolts 42, which project thru both mesh layers and between parallel rows of the cans; and stuccoing both the exterior and interior layers of the mesh, thus making a very strong upright wall, roof and floor.

The illustrated structure optionally may be constructed on a permanent building site, in which event, the layer of material 9' may be a poured concrete slab or other foundation (similar to 9 of FIG. 2). Or the structure may be a transportable mobile home, or transportable house sections that may be bolted together at a building site, or a lawn building or the like.

When it comprises a tubular frame of a house, building section or the like which may be transported to a building site and there finished, it may be constructed in accordance with a method that comprises the following steps: a. placing in parallel arrangement the lower-floor rows of end-joined cans, 43, elevated from a workshop floor by benches or sawhorses beneath the can-row ends; b. sheathing the upper and lower portions of these tubular members by the layers 44 of mesh and clamping these layers to the can rows by insertion of bolts 42 thru the mesh layers and between can rows and screwing nuts on the threaded bolt ends, taking up slack in the mesh layers and clamping them to the tubular members; c. placing the bottom four-sided set of angled can rows comprising the cans 45 on the top layer of the mesh 44, with spaced lumps or layers of epoxy putty, mortar, or other bonding material (10 in FIG. 1 or 8 in FIG. 2) between the mesh and at least some of the cans 45, and especially between the mesh and corner connections of the can rows of one of the types shown in FIGS. 2 to 5; d. successively laying other horizontal, four-sided tiers of the can rows up to the top of the desired walls, preferably holding them securely in place by spaced bits of epoxy putty or the like between upper and lower cans; e. fastening and clamping parallel layers of mesh, 46, on the exterior and interior sides of the stacked can rows of the exterior upright wall by bolts 42; f. successively laying the parallel triangular roof-frame members 2-3-5 (previously subassembled as set forth above) in place with their ends resting on upper portions of the upright-wall frames, and held stabilized on these wall frames by loops of end-bolted pipe strap, or loops of twisted wire or the like as well as epoxy putty or other bonding material on upper and lower cans of adjacent roof and wall tubular members; g. attaching parallel layers of mesh, 46', on each side of the sets of tubular members 2, 3 and 5, holding the mesh in place and clamped to the tubular members by bolts and nuts, 42, and optionally bits of epoxy putty, solder or the like; h. laying the bottom can rows of the interior partitions (47 and any desired other partitions) on can rows of the lower-floor tubular frame 11 and fixing these rows in place of epoxy putty, mortar or the like, 48; i. successively stacking the other partition rows of cans on these lower can rows, up to the ceiling mesh, and placing the bits or layers of epoxy putty, mortar or the like 48' between this ceiling mesh and top portions of these can rows; j. clamping opposite layers of mesh to each stacked assembly of the lower partition tubular members by bolts 42 and/or epoxy putty, solder or the like; k. troweling or spraying interior lower-story stucco 49 to the interior mesh of the exterior upright walls, of the partitions, and the ceiling, thus strengthening and bracing the lower structure and the ceiling (this stucco 49, as well as any other stucco of this invention, comprises fine aggregate or filler and cement which may be calcareous — portland cement, mortar cement, lime, or interior-plaster cement — or epoxy, other glue, or the like; l. forming the frames of tubular members and mesh of any desired attic partitions (50) as the tubular frames of the partitions 47 were made; m. troweling or spraying the interior stucco 51 on the attic tubular frames; n. transporting the incomplete structure to a building site and fastening it on a foundation by mortar, epoxy putty or the like; o. troweling or spraying stucco on exterior mesh at the building site; p. after the stucco thoroughly sets, painting it, preferably with concrete paint of the "Stadri" or "Bondex" type.

Optionally, instead of applying mesh on both sides of the can rows of the outside walls, the ceiling and the roof, in steps e and g, this mesh is applied only on the outside surfaces of the wall and roof canrows and on the lower surface of the ceiling can-rows; and instead of the eliminated layers of mesh, panels of insulating board (e.g., celotex, masonite or plywood), illustrated in FIG. 6A at 44A may be utilized. The bolts 42 (optionally having heads that are countersunk in the board) then are extended thru the board and apertures of the single layer of mesh 44, and between the can rows; nuts are screwed on the bolts against the mesh, and the stucco 51A is troweled or sprayed on the mesh. FIG. 6A also shows another optional structural detail, the foamed plastic 51B. The mixed liquids that form this foamed plastic are poured or injected downward into the spaces between the can tubes while the can rows are on the boards 44A and before the wire mesh 44 is fastened over the cans. Preferably, as shown, this foamed plastic does not entirely fill the spaces between the can tubes.

FIGS. 6 to 12 illustrate different types of tubular members that may be used in any of the forms of the structure of FIGS. 1 to 5 and 6A. The cans utilized preferably are cylindrical and of metal, but optionally may be of dense, strong plastic or of glass (jars, bottles, or the like); and the insulation which preferably is in the cans of each of FIGS. 1 to 12 may be of any known type. But preferably the insulation used is relatively inexpensive — for examples: dry sand, mixed of course with air; preservative-treated or slightly charred sawdust; cedar or cypress or redwood sawdust; shredded cedar, cypress or other bark; spent tanbark; bits of pine bark of the type commonly used as mulch; rather finely ground pine or other bark; light-weight topsoil or other dirt or dust; ashes or cinders; bits of charcoal or coke; preservative-treated cotton linters or bolls; rice hulls, preferably preservative-treated; cottonseed hulls or other seed or nut hulls; vermiculite; tufts of rock wool or the like; crushed lava rock, expanded baked clay or shale. Air held in spaces small enough to prevent appreciable circulation of it is an excellent insulating material. When marble is considered as having an insulating value of 1, fiber insulating board has a relative insulating value of 57 and air in "thin layers" has an insulating valve of 100. (*Funk and Wagnalls Encyclopedia*, 1973, Vol. 13, p. 322.) Therefore, dead air alone in the cans, especially when they are of a smaller type (e.g. of beer or soft-drink cans), is a good insulating material in this invention. Many cans are of aluminum and many that are mostly of steel have aluminum tops; and the aluminum and shiny steel of these cans also has considerable value in thermal insulation. The cans may be any shape or size of can, jar or bottle, each row of which is end-joined by epoxy putty or other glue, and/or the bolts or rivets of FIG. 11, and/or the pieces of adhesive tape (52, 65 and 65') of FIGS. 6, 8, 9 and 10.

When the cans are of the same diameter, this fastening means, between each adjacent pair of can ends, preferably is a piece of slightly stretchable adhesive tape. Epoxy putty or other pasty glue may first be applied between the can ends and then the tape wrapped around them. But preferably only adhesive tape is used. The present inventor has discovered that, surprisingly, a row of the cans, end-joined by masking, plastic, electrical-insulation tape, friction tape (or other slightly stretchable adhesive tape) is very strong. Masking tape or rubber insulation tape, inexpensive and widely sold, is preferred.

The cans may be of the type shown at 53 in FIGS. 6, which is commonly used to contain liquids. Although they may be new they preferably are used cans that have contained beer or soft drinks, paint, fruit juice or coffee. When the insulation used is easily poured out of the cans (for example, vermiculite, sawdust, ground bark, dry sand, rice or cottonseed hulls, or loose dry earth) the opening 54 in a can-end cover may be closed by a bit of masking or other adhesive tape, 55. Preferably, the rolls of this tape are punctured in triangular lines, so that triangles of the tape may be easily detached from a tape roll, without waste of material. Each of the cans 53 comprises a tube 56 and at each end of this tube an end cover 57, which has an end recess 58. As illustrated in FIG. 12, the cans are of different diameters and end caps of the smaller cans 53A fit inside recesses of the larger cans 53; and they are glued in place by epoxy putty, silicone-rubber cement or other adhesive, 53B. As shown in FIG. 6, the cans are of equal diameters, and optionally may have their end covers glued together by epoxy putty or the like, but in any event they are fastened together by the pieces of adhesive tape 52 which are wrapped tightly around and encompass the end caps 57. These end caps preferably project beyond the outlines of the can tube, providing rims 60 of the cans; and in wrapping the tape around the can ends its middle part slightly stretches at these rims, so that it arches over them. The can covers are tightly positioned in contact; and thus, when pressure is applied to a middle portion of a can row the cans do not break apart, for the tape strongly binds the rims together. It has portions on each side of the middle circle of the rims which adhesively grip cylindrical portions of the can tube as well as side portions of the rims.

Optionally, the cans may be of the type shown at 61 in FIGS. 8 and 9. This can is of the common, corrugated, enameled, coffee-containing kind, and preferably is used; it is filled with insulation 62 and closed at its opened end by the plastic cap 63 which is a part of the commonly sold can assembly. In FIG. 8 the two plastic caps 63 and 64 are contiguous; and the piece of adhesive tape 65, which is wider than the adhesive strip 52 of FIGS. 6 and 8, is tautly wrapped around the rims of 63 and 64, and stretched at its middle, rim-encircling portion so as to tightly grip the outermost, annular surface of the rims, as well as their side surfaces. Adhesive bands 65 thus join a plurality of pairs of the corrugated cans; and a number of these pairs are end-joined to form an elongated tubular member, as indicated in the right-hand portion of FIG. 8. Here metallic end caps 66 and 67 of two of the pairs of cans are contiguous; and, optionally with or without application of glue between the end caps, their rims are tautly encircled by the adhesive tape 52, which stiffly stretches at its middle portion to arch over the outer rim surfaces, while parts of its side portions grip side surfaces of the rims and other parts tightly and adhesively adhere to cylindrical portions of the can tube. This joint is similar to the junction between the cans of FIG. 6. In FIGS. 6, 8, and 9, after the adhesive tape is wrapped around the abutting can ends it is further applied to the rims in an overlapping tape portion. If desired for extra strength the tape may encircle the can ends twice; or a wider piece of tape may be wrapped around a narrower tape band; but at present this is not deemed advisable.

In each of the figures the light-weight, elongated tubular member of joined cans is preferably at least five feet long - at the sides of window or door frames or in closet walls. And when in a bar above or below a window or door frame, or used as a ceiling joist or rafter, it has the entire desired length of the wall, ceiling joist, or rafter.

The tubular member or can row of FIG. 9 has an optionally different type of joint between can ends from that of FIG. 8. In FIG. 9, at each adjacent pair of can ends of the elongated tubular member, the plastic cap 63 which snaps over and covers the open end of the can 61 is contiguous with the metallic end cap 67 of an adjacent can, 61A. Optionally with or without the application of glue or other bonding material between 63 and 67, their abutting rims are strongly held in abutment, being tautly encompassed by the adhesive band 65, and portions of this band are stretched to tightly grip surfaces of the rims of plastic cap 63 and outer surfaces of the rim of the metallic cap, while other band portions, having smaller radii, adhere to side portions of the rims and cylindrical portions of the two cans. The inventor currently prefers the type of junction between opened plastic-cap-closed cans of this type that is illustrated in FIG. 8.

With reference to FIG. 9, considered as an end portion of an elongated can-row: optionally, the plastic end cap 63 may be eliminated; in which event, the open right-hand end of the used or new can 61 is jammed against the end cover 67 of the new or used can 61A. Preferably, all the cans of the tubular member of such cans are assembled in end-to-end relation in a fixture; and preferably each of the open ends is soldered or welded in several spots to the bottom end of the adjacent open can. At the opposite end of the can-row the last two cans have their opened ends in contact and thoroughly soldered or welded or glued together. After this end-bonding operation is done, preferably each joint between cans is tautly wrapped with the bands of slightly stretchable tape 52.

FIG. 7 shows a can of the kind which commonly contains paint. Adjacent pairs of this type of cans may be end-joined by any of the joints between can ends of FIGS. 1 to 6, 11 and 12, thus forming an elongated tubular member. This can of FIG. 7 has a lid 69 which snaps within and is frictionally held by the rim 70. The lid has a groove 71; and the can's bottom has a rim which is similar to the rim 70. Optionally, such cans, as well as those of FIGS. 6 and 10 may be soldered, epoxy-glued, welded or otherwise bonded together in a row; but whether or not this is done the end covers of adjacent pairs of cans of the type of FIG. 7 preferably are encompassed and fastened together by bands 52 of adhesive tape.

The cans 72 of FIG. 10 may be of dense plastic, but preferably they are glass jars or bottles. Each of these containers is preferably filled with insulation of an above-described type and closed at one end by a metal or molded-plastic cap 73. This cap is screwthreaded and sealingly fits on the screwthreaded open end of the can. The caps are fastened together by solder, welding or a layer 74 of epoxy putty, silicone-rubber cement or other bonding material.

The other end of each of the jars or bottles preferably has an annular bulge, 75; and this bulge preferably is gnarled, by forming numerous tiny protuberances 76 on it during the process of its molding. Some jars and bottles now commonly sold have such a gnarled bulge; and these may be used; or, alternatively, specially made glass or plastic jars with such bulged and gnarled closed ends may be utilized. As illustrated in the right-hand portion of FIG. 10, each pair of adjacent bulged ends of the jars are fastened together by bands of adhesive tape 65'. These bands, with overlapping ends, are stretched to fit snugly around radially outer portions of the bulge 75 and tiny protuberances 76. When the jars have no bulges at their closed ends their end walls may be roughened by coarse sandpaper or a grinding wheel; and these walls may be fastened together by a layer 74 of epoxy putty or the like. Also, optionally but not preferably, the end wall adjacent to a bulge 75 may be thus roughened and glued to a similar, bulged end of each adjacent jar, before wrapping the bulges with the adhesive tape 65'.

Alternatively, and with or without optional glue 74, each adjacent pair of the end caps 73 or plastic caps 63 and 64 may be fastened together by one or more rod-like elements (rivets or bolts and nuts, 77).

Window and door frames in the walls may be of metal, wood, rigid foamed plastic or of the type of the inventor's prior U.S. Pat. No. 3,853,349. When they are of wood or porous plastic, and thin enough, nails may be driven thru them and into ends of the adjacent cans. Otherwise, straps or bars of the type shown at 19' may be bolted or screwed to the frames and screwed to sidewalls of adjacent cans. In any event, epoxy putty or other bonding material preferably is placed between each side of the frames and adjacent can ends.

When the invention is embodied in a building that is transportable in sections to a building site the final house or other structure may have double walls where the sections in final assembly are juxtaposed and strapped and bolted and/or bonded together. In this adaptation, for instance, the front house part, shown in cross section in FIG. 1, may have front and rear walls that, for example, are fourteen feet apart; and a separately transported back section of the house may have similar dimensions. Thus, each of the rooms 77 and 78 may be made square and fourteen feet in each horizontal dimension, and the hallway 79 may be five feet wide and fourteen feet long with a doorway at the rear leading to the hallway in the back house section. Alternatively: the structure may be divided at the central vertical plane along the ridge of the roof; the ceiling and floor are also bisected along this plane of division, and at the building site their halves are joined by bolts and straps like 19, and/or epoxy putty or other bonding material; and the roof peak is of the type shown in FIG. 4. With either method of division the sections may be easily transported to the building site.

Optionally, the building may be finally assembled at a building site from elongated, wide, very easily transportable wall panels. These may include, for example: two or more tubular-floor parts; two or more parts of each of the upright exterior and interior walls; and roof panels. At the building site these may be fastened at their adjoined pairs of edges by screws or bolts, straps like 19, and epoxy putty, solder, welding, mortar or the like.

Various changes may be made within the scope of the following claims. For instance, instead of stuccoing only the interior surfaces of the outside walls at the factory as stated above, in an optional method, all the walls may be stuccoed in the plant. For extra stability during transport to a building site, any stucco applied in the factory preferably comprises epoxy or other strong cement mixed with light-weight fine aggregate or filler — for example vermiculite, cinders, or ground foamed-plastic scraps.

In the claims, unless otherwise qualified: the word "can" means a used or new tubular element of any cross-sectional shape of metal, plastic, glass, or other material: "stucco" means cement (portland cement, lime and portland cement, epoxy cement or putty, or any other cement), mixed with fine aggregate or filler; "rod-like element" means a bolt, screw, rivet, nail or piece of wire; "bonding material" signifies epoxy putty or cement or other glue, or mortar, solder, welding, or brazing material; and "gaseous material" means air, or any pure gas, mixture of gases, or gas-containing insulation or plastic (for example, loose material and air, or gas-cell-containing foamed plastic), under atmospheric or above-atmospheric or sub-atmospheric pressure; and "wall" means an upright wall, ceiling or ceiling portion, a roof or roof part.

I claim:

1. Structure, including:

in upright walls, angularly joined at corners and defining an interior space, a plurality of uprightly stacked sets of intersecting, substantially horizontal rows of cans; each of said sets comprising a plurality of joints, each angularly joining a pair of said horizontal rows at one of said corners; each of said rows comprising: a plurality of end-joined, coaxial cans having substantially horizontal axes and can sidewalls each of which surrounds and encloses a canned space and can-cover elements at ends of said sidewalls; gaseous material in said cans; and connecting means fastening together ends of each pair of adjacent cans in the row;

each of said horizontal rows of cans comprising: at one of its ends a first-named row-end can-cover element which is closely adjacent to the mesh and to stucco of an outer wall surface; and at its other end a second-named can-cover element that is spaced from the mesh and stucco of another outer wall surface, the said second-named can-cover element being in contact with an intervening can sidewall that is between this second-named can-cover element and said last-named wall surface;

each of said corner joints comprising: a pair of row-end cans having intersecting axes, one of said row-end cans having a said can-end cover element in abutting relation with a can sidewall of the other of said row-end cans; and connecting means fastening said abutting cover element and sidewall, comprising a piece of strength-providing material and rod-like elements fastening said piece to said row-end cans;

the said sets of horizontal, intersecting rows of cans comprising a bottom set and a plurality of upper sets, stacked one above the other; each of said upper sets comprising at each of two diagonally-arranged wall corners a said first-named row-end can-cover element that is above a said intervening can sidewall, and at each of two other diagonally-arranged wall corners a said intervening can sidewall that is above a said first-named row-end can-cover element;

mesh, adapted to receive and hold stucco, on exterior sides of said can rows; interior wall material on inner sides of said can rows; rod-like elements, holding and positioning said mesh on said can rows; top, water-shedding structure; and means fastening said top structure to upper portions of said upright walls.

2. Structure as set forth in claim 6, in which the said gaseous material comprises thermal insulation capable of being poured into said cans.

3. Structure as set forth in claim 2, further including additional insulating material, a portion of which is located between said angled branches of the stacked tiers.

4. Structure as set forth in claim 3, in which said additional insulating material comprises porous-concrete pilasters at corners of the said upright walls.

5. Structure as set forth in claim 1, in which said interior wall material comprises stiff, solid panels of shape-holding material.

6. Structure as set forth in claim 5, further including portions of foamed plastic between can tubes of adjoining rows and on said panels.

7. Structure as set forth in claim 1, in which each of said ceiling and roof can rows comprises: aligned coaxial cans; and means fastening together adjacent pairs of can-cover elements, of said last-named cans, comprising bands of adhesive tape around can-end portions.

8. Structure, including:
in roof-and-ceiling combination, a tubular, strength-providing roof-and-ceiling frame which comprises: a plurality of parallel, strength-providing roof rows of end-joined cans, conforming to water-shedding surfaces of the roof, each of said rows having coaxial cans, and each of said cans comprising a tube and a can-end cover element at each end of the tube; each of said rows comprising connecting means between and fixed to each pair of said adjacent can-end cover elements, and gaseous material in said cans; mesh, adapted to receive and hold stucco, on exterior sides of said roof rows; inside wall material on interior sides of said roof rows; rod-like elements extending thru said mesh, holding said mesh and wall material against said roof rows; a plurality of parallel, substantially horizontal ceiling rows of end-joined ceiling cans, each of said ceiling cans comprising a tube and a can-end cover element at each end of the tube; each of said ceiling rows comprising connecting means between each adjacent pair of said last-named can-end cover elements, and gaseous material in said ceiling cans; mesh, adapted to receive and hold stucco, on at least one side of said ceiling rows; wall material on the other side of said ceiling rows; rod-like elements extending thru said last-named mesh, holding mesh, ceiling rows and wall materials in assembled relation;
the said ceiling rows intersecting and abutting said roof rows in joints at outer corners of said frame; each of said joints comprising a metallic loop encompassing and clamping together abutting end cans of a ceiling row and a roof row above said last-named ceiling row;
stucco, impregnating and coating the layers of mesh of said roof-and-ceiling tubular frame; and
upright walls, comprising vertically stacked horizontal rows of coaxial, end-joined wall cans below and supporting said roof-and-ceiling structure, each of the said horizontal rows including an aligned plurality of coaxial cans and connecting means between each aligned pair of said wall cans comprising adhesive tape around can ends.

9. Structure as set forth in claim 8, in which: said wall material on the roof-rows and ceiling-rows of cans comprises layers of mesh; and said gaseous material in said roof and ceiling cans is porous insulation and air.

10. Structure as set forth in claim 8, in which: said roof-rows and ceiling-rows include cylindrical cans of different diameters, and can-cover elements of smaller cans fit inside end recesses of larger cans; and the said connecting means between adjacent pairs of end-joined cans comprises bonding material within said recesses, between said can-cover elements of the larger and smaller cans.

11. Structure as set forth in claim 8, in which: the said connecting means between adjacent pairs of end-joined cans comprises bands of adhesive tape tautly wrapped around abutting can-cover elements.

12. Structure as set forth in claim 8, in which said wall material adjacent to said roof-rows and ceiling-rows of cans comprises panels of solid material having thermally-insulating properties.

13. Structure, including:
in upright walls, angularly joined at corners and defining an interior space, a plurality of uprightly stacked sets of intersecting, substantially horizontal rows of cans; each of said sets comprising a plurality of joints, each angularly joining a pair of said horizontal rows at one of said corners; each of said rows comprising: a plurality of end-joined, coaxial cans having substantially horizontal axes and can sidewalls and can-cover elements at ends of said sidewalls; gaseous material in said cans; and connecting means holding together ends of pairs of adjacent cans in the row;
each of said horizontal rows comprising: at one of its ends a row-end can-cover element which is closely adjacent to a wall surface; and at its other end another row-end can-cover element which is spaced from another wall surface, the said last-named can-covered element being in contact with an intervening can sidewall that is between this last-named can-cover element and said last-named wall surface;
each of said corner joints comprising: a pair of row-end cans having intersecting axes, one of said row-end cans having a said can-end cover element in abutting relation at a plane of division between can rows with a can sidewall of the other of said row-end cans; and connecting means, extending across said plane of division, connecting said abutting cover element and sidewall;
the said sets of horizontal intersecting rows comprising a bottom set and a plurality of upper sets stacked one above the other; each of said upper sets comprising a plurality of row-end can sidewalls at said corners, each of said row-end sidewalls overlying a line in said plane of division, reinforcing said structure against breakage at said planes; wall material on opposite sides of said can rows; means holding said wall material on said can rows;

top, water-shedding structure; and means connecting said top structure to upper portions of said upright walls.

14. Structure as set forth in claim 13, in which said first-named connecting means comprises adhesive tape connecting said ends of pairs of cans in the row.

15. Structure, including:

in upright walls, angularly joined at corners and defining an interior space, a plurality of uprightly stacked sets of intersecting, substantially horizontal rows of cans; each of said sets comprising a plurality of joints, each angularly joining a pair of said horizontal rows at one of said corners; each of said rows comprising: a plurality of end-joined, coaxial cans having substantially horizontal axes and can sidewalls and can-cover elements at sidewall ends; gaseous material in said cans; and connecting means, comprising stretchable adhesive tape tautly wrapped around abutting can ends, fastening together ends of pairs of adjacent cans in the row;

each of said horizontal rows of cans comprising: at one of its ends a row-end can-cover element which is closely adjacent to a wall surface; and at its other end another can-cover element that is spaced from another wall surface, the said last-named can-cover element being in contact with an intervening can sidewall that is between this last-named can-cover element and said last-named wall surface;

each of the said corner joints comprising: a pair of row-end cans having intersecting axes, one of said row-end cans having a said can-cover element in abutting relation with a can sidewall of the other of said row-end cans at a plane of division between can rows; and connecting means fastening together said abutting cover element and sidewall, comprising a strip of strength-providing material, extending across said plane of division; and means fastening said strip to said row-end cans;

wall material on opposite sides of said can rows;

means holding said wall material on said can rows;

top, water-shedding structure; and means connecting said top structure to upper portions of said upright walls.

* * * * *